United States Patent
Zhao et al.

(10) Patent No.: US 11,062,103 B2
(45) Date of Patent: Jul. 13, 2021

(54) DIGITAL BARCODE READER

(71) Applicant: ZEBRA TECHNOLOGIES CORPORATION, Lincolnshire, IL (US)

(72) Inventors: Wancheng Zhao, St. James, NY (US); Steven D. Sieckowski, Port Jefferson, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 128 days.

(21) Appl. No.: 16/430,187

(22) Filed: Jun. 3, 2019

(65) Prior Publication Data

US 2020/0380219 A1 Dec. 3, 2020

(51) Int. Cl.
*G06K 7/10* (2006.01)

(52) U.S. Cl.
CPC ......... *G06K 7/109* (2013.01); *G06K 7/10861* (2013.01)

(58) Field of Classification Search
CPC ..... G06K 7/10693; G06K 7/14; G06K 10/881
USPC ............ 235/462.01, 454, 375, 462.14, 462.2
See application file for complete search history.

(56) References Cited

U.S. PATENT DOCUMENTS

| | | | |
|---|---|---|---|
| 5,149,949 A | 9/1992 | Wike, Jr. | |
| 8,186,592 B2* | 5/2012 | Fletcher | F16M 13/00 235/454 |
| 10,268,856 B1 | 4/2019 | Jahnke | |
| 2001/0032884 A1 | 10/2001 | Ring et al. | |
| 2002/0066838 A1* | 6/2002 | Katoh | G06K 7/10881 248/133 |
| 2003/0222150 A1* | 12/2003 | Sato | G06K 7/10881 235/472.02 |
| 2005/0189422 A1 | 9/2005 | Wood et al. | |
| 2006/0180670 A1* | 8/2006 | Acosta | G06K 7/12 235/462.31 |
| 2007/0017997 A1* | 1/2007 | Talley | G06K 7/109 235/462.43 |
| 2008/0128499 A1 | 6/2008 | Chen et al. | |
| 2008/0302873 A1* | 12/2008 | Kotlarsky | G06K 7/10712 235/462.15 |
| 2014/0197240 A1 | 7/2014 | Mistkawi | |

OTHER PUBLICATIONS

International Search Report and Written Opinion for International Application No. PCT/US2020/029269 dated Jul. 27, 2020.

* cited by examiner

*Primary Examiner* — Edwyn Labaze
(74) *Attorney, Agent, or Firm* — Yuri Astvatsaturov

(57) ABSTRACT

A barcode reader assembly for capturing at least one object appearing in a field of view (FOV) is provided that includes a reader, a gear member, and a stand. The reader includes a reader enclosure having a top portion and a bottom portion which forms a base. The gear member includes a gear member coupling portion, and is mechanically coupled to the bottom portion of the reader enclosure. The stand includes a platform and a platform coupling portion. The gear member coupling portion is mechanically coupled to the platform coupling portion such that the reader is rotatable relative to the stand.

17 Claims, 10 Drawing Sheets

DIGITAL BARCODE READER

BACKGROUND OF THE INVENTION

Barcode and other scanning devices generally capture images within a given field of view (FOV). In some instances, barcode readers are known to be used in multi-mode environments where the same reader can be used in a handheld mode in addition to a presentation mode where a product is presented to the reader and the reader activates an imaging assembly. As such, there are various situations where the reader may need to be held by hand and moved around, or it may be preferable to have the reader reside on a stable surface such as a table, counter top, or a generally vertical surface such as a wall.

Accordingly, there is a need for improved accessories having improved functionalities.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
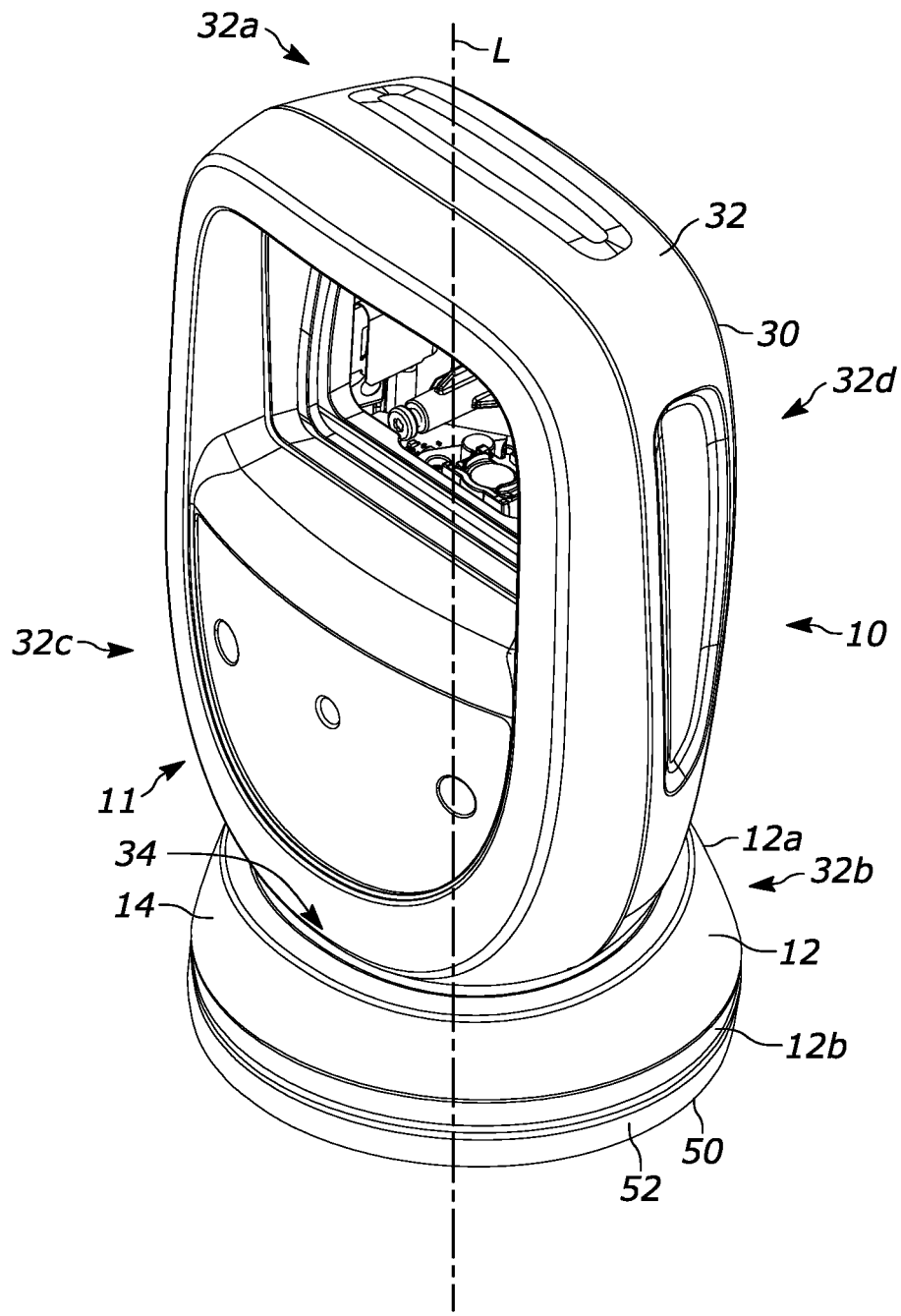
FIG. 1 is a front perspective view of a portable, industrial digital barcode reader assembly having a reader and a stand in accordance with this disclosure.
Figure 2:
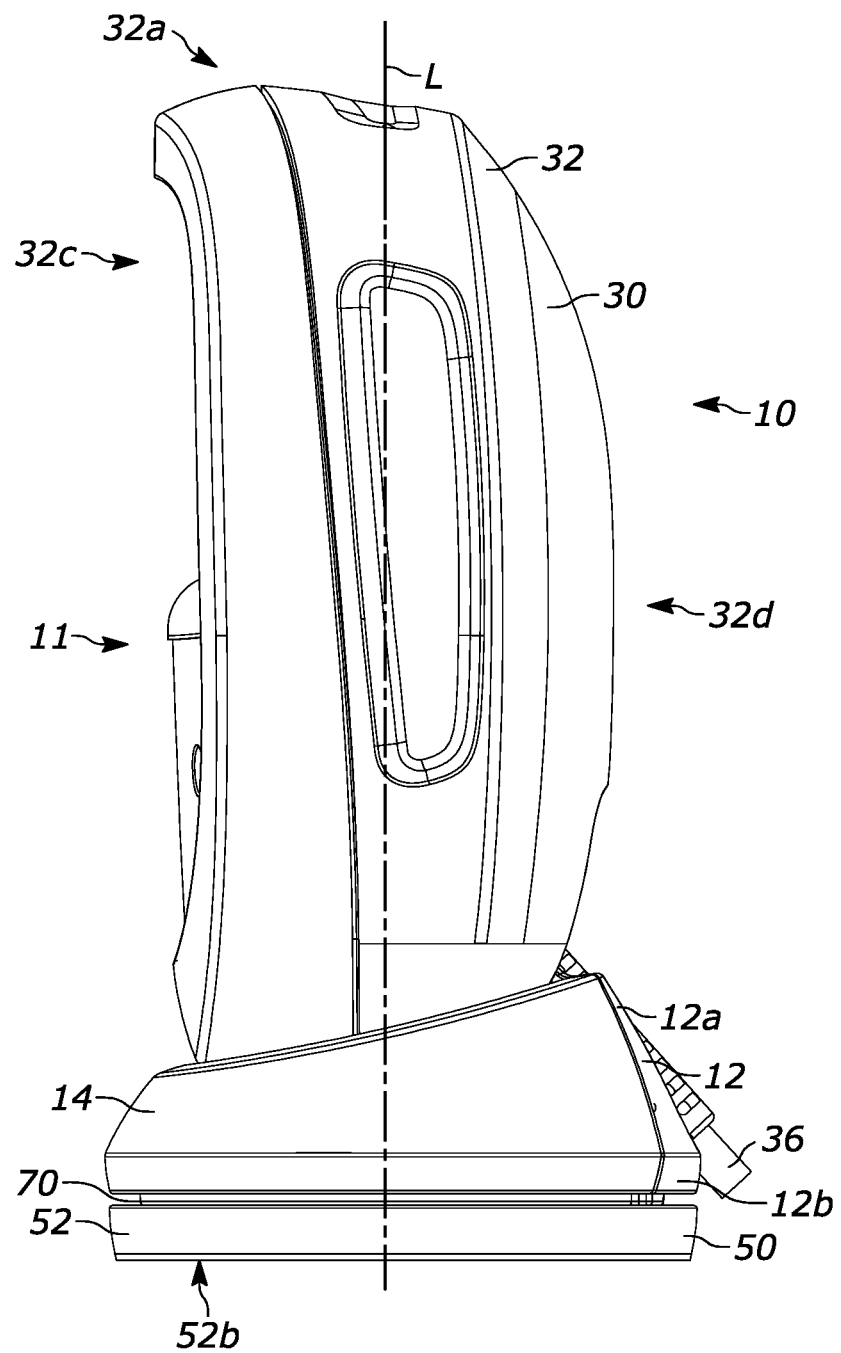
FIG. 2 is a side elevation view of the industrial digital barcode reader assembly of FIG. 1 in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an embodiment, the present application provides a barcode reader assembly for capturing at least one object appearing in a field of view (FOV) is provided that includes a reader, a gear member, and a stand. The reader includes a reader enclosure having a top portion and a bottom portion. The gear member includes a gear member coupling portion, and is mechanically coupled to the bottom portion of the reader enclosure. The stand includes a platform and a platform coupling portion. The gear member coupling portion is mechanically coupled to the platform coupling portion such that the reader is rotatable relative to the stand.

In some examples, the gear member may be formed integrally with the reader enclosure. Further, in some approaches, the stand may include a mounting structure to mount the stand to an object.

In some aspects, the gear member is coupled to the platform via a mechanical linkage that includes a locking protrusion component which extends upwardly from the platform. The locking protrusion component may include at least one key member that extends transversely from a portion of the locking protrusion component.

In some examples, the gear member may include a number of recesses. Further, the platform may include at least one ratchet arm that selectively engages the recesses to at least temporarily restrain the reader at a desired rotational position relative to the stand. In some of these examples, the gear member may include between approximately 30 and 40 recesses. The ratchet arm may be formed by a cutout formed on the platform, and may be rotatable about a connection point formed on the platform.

In some aspects, the barcode reader assembly may further include a mechanical stop that is formed on one of the reader enclosure, the gear member, or the platform. The mechanical stop is engageable to restrict relative rotation between the reader and the stand.

In other examples, the reader base may be coupled to the platform via a mechanical linkage. The mechanical linkage may include a locking protrusion component that extends downwardly from the gear member.

In another implementation, an accessory base for a barcode reader for capturing at least one image of an object appearing in a field of view (FOV) includes a reader, a gear member, and a stand. The reader includes a reader enclosure having top and bottom portions. The bottom portion of the reader enclosure includes a reader coupling portion. The stand includes a platform. The gear member is mechanically coupled to the platform of the stand, and includes a gear member coupling portion. The gear member coupling portion is mechanically coupled to the reader coupling portion such that the reader is rotatable relative to the stand.

In yet another implementation, a stand for a barcode reader assembly for capturing at least one image of an object appearing in a field of view (FOV) includes a platform, a locking protrusion, and at least one ratchet arm. The platform includes a body having upper and lower surfaces. The locking protrusion extends upwardly from the upper surface of the body, and has at least one key member extending transversely from a portion of the locking protrusion. The at least one ratchet arm is formed by a cutout formed on the body and is rotatable about a connection point formed on the body. The at least one ratchet arm has a finger extending upwardly from the upper surface of the body.

In yet another implementation, a stand for a barcode reader assembly for capturing at least one image of an object appearing in a field of view (FOV) includes a platform and a gear member. The platform includes a body having upper and lower surfaces. The gear member is positioned at the upper surface of the body of the platform and includes a gear member body, a coupling portion at least partially formed by the gear member body, and a plurality of recesses arranged around the coupling portion. The coupling portion includes a throughbore extending through the gear member body and at least one rotational stop positioned at or near the throughbore.

As previously noted, the reader assembly captures at least one image of an object appearing in a FOV. One such example of an object is a barcode. As used herein the term barcode may refer to one-dimensional or two-dimensional barcodes and/or other symbologies used to encode information associated with items.

Turning to the figures, reference numeral 10 generally identifies a barcode reader assembly that includes a reader 11 in the form of an ovoid-shaped housing having a reader enclosure 30 that defines a body 32 which includes a top portion 32a, a bottom portion 32b, a front portion 32c, and a rear portion 32d opposite the front portion 32c. The bottom portion 32b of the reader enclosure is in the form of a base 12. The reader assembly 10 additionally includes a stand 50 to which the base 12 selectively couples.

The base 12 includes an upper portion 12a and a lower portion 12b. The upper portion 12a of the base 12 includes a curved base surface 14 extending about a perimeter thereof. As will be discussed in further detail below, a gear member 70 is coupled to lower portion 12b of the base. This gear member 70 cooperates with a rotational axis of the stand 50 that the barcode reader 11 rotates about. The base 12 may be constructed from any number of suitable materials such as, for example, polymers and/or metallic materials. Other examples are possible.

The reader enclosure 30 is mechanically coupled to the base 12 (for example, by way of a mechanical linkage). The front and rear portions 32c, 32d of the enclosure body 32 may be in the form of front and rear housings or clamshell members that operably secure to each other using any number of suitable approaches (e.g., fasteners, frictional and/or slotted engagement members, etc.).

Figure 3:
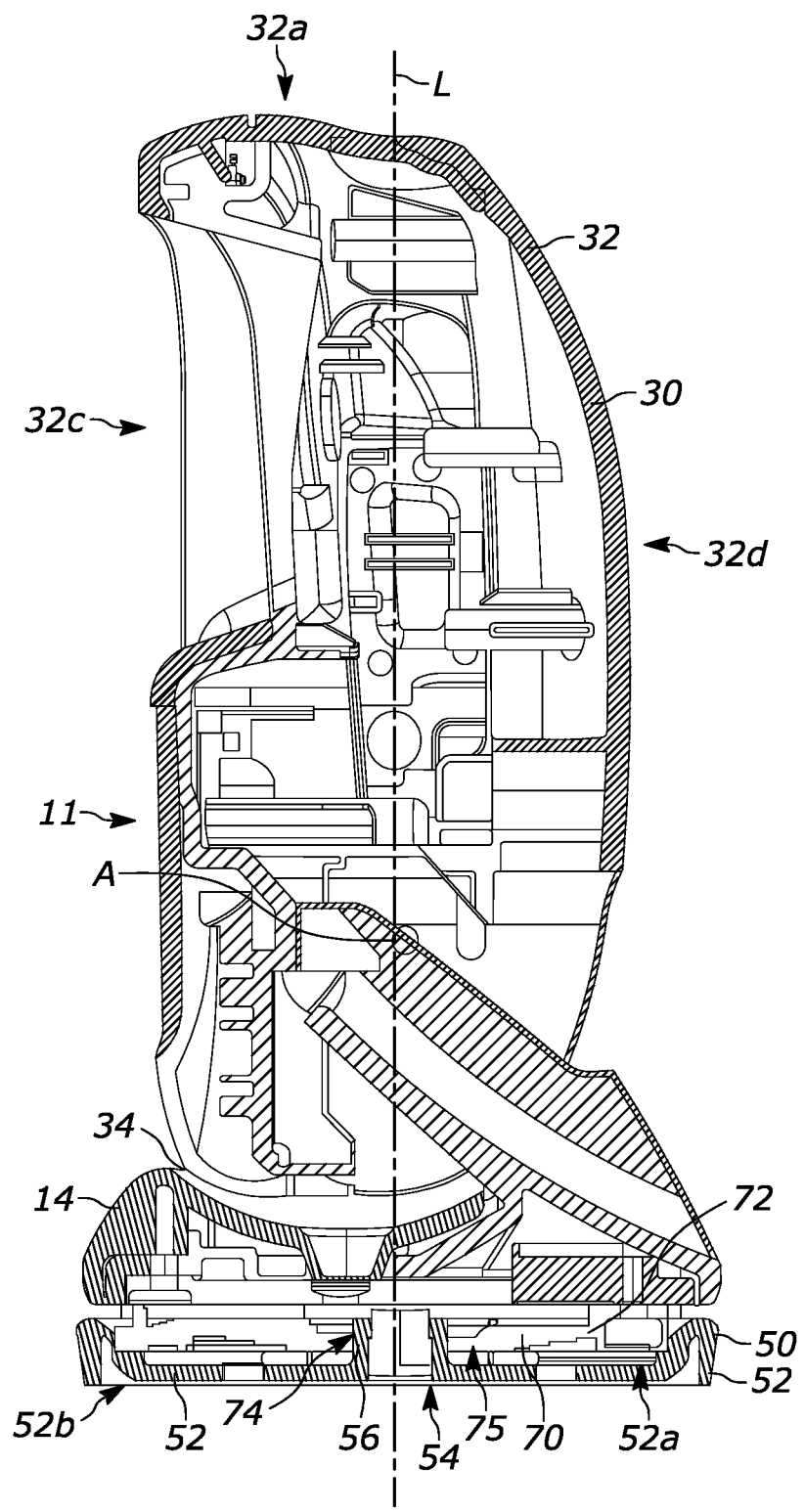
FIG. 3 is a side elevation cross sectional view of the industrial digital barcode reader assembly of FIGS. 1 and 2 in accordance with this disclosure.

In the illustrated example, the bottom portion 32b of the enclosure body 32 further defines a curved reader enclosure surface 34. In the illustrated example, the curved reader enclosure surface 34 is generally spherical, and nests within the upper portion 12a of the base 12. The enclosure body 32 further defines a rear cutout to accommodate an external data and/or power cable 36. Generally, the reader enclosure 30 is rotatable relative to the base 12 about an axis "A" via a mechanical linkage carried by the reader enclosure 30 or the base 12. Specifically, U.S. Provisional application Ser. No. 16/245,969, filed on Jan. 11, 2019, describes industrial digital barcode readers having specific mechanisms providing for relative movement (e.g., rotation) of components. The entire contents of this application are incorporated by reference herein. Specifically, as illustrated in FIG. 3, the reader enclosure 30 rotates about the axis A, which is illustrated as being orthogonal to the cross-sectional view. The mechanical linkage may include a ratchet protrusion (not shown) that defines any number of ratchets or detents to allow for selective positioning of the reader enclosure 30 relative to the base 12. A portion of the enclosure body (e.g., the rear portion 32d) may additionally define a pawl bore to accommodate a resilient member (e.g., a spring) and a pawl member, whereby the resilient member can urge the pawl member into engagement with the ratchet protrusion, whereupon the pawl member may selectively engage with and/or be retained within a desired detent.

In the illustrated example, the stand 50 includes a platform 52 and a platform coupling portion 54. The platform 52 has a generally circular footprint that corresponds to the shape of the base 12, and includes an upper side 52a and a lower side 52b. The platform coupling portion 54 is in the form of a locking protrusion 56 extending from the platform 52 in a generally upward direction. The stand 50 may be constructed from any number of suitable materials such as, for example, polymers and/or metallic materials. Other examples are possible.

The stand 50 may additionally include any number of mounting structures 51 used to secure the stand 50 to an object such as a table, a register, a desk, a wall, or any other component. In the illustrated example, the mounting structure 51 is in the form of a hole or throughbore that accommodates a fastener (e.g., a screw or bolt), but in other examples, other devices such as adhesives, hook-and-loop fasteners, and the like may be used. Additionally, the stand 50 may include a visual indicator 57 that provides a user of a required direction of rotation to rotatably lock the reader 11 to the stand 50.

The locking protrusion 56 extends upwardly from the upper side 52a of the platform 52 and is positioned in a generally central location thereof. The locking protrusion 56 is in the form of a cylindrical element having a proximal end 56a positioned at or near the upper side 52a of the platform 52 and a distal end 56b, and extends along a longitudinal axis "L". In the illustrated example, the locking protrusion 56 is in the form of a hollow cylinder, but in some examples, the locking protrusion 56 may have any shape and may alternatively be solid. In some examples, the platform 52 may define a recessed and/or cut out portion 53 that corresponds to the general shape of the locking protrusion 56.

Positioned at the distal end 56b of the locking protrusion 56 are any number of key members 58. The key member or members 58 extend transversely from the longitudinal axis L. Further, the key member or members 58 have a larger cross-sectional dimension than the remainder of the locking protrusion 56. Each key member 58 includes side contact surfaces 58a that extend in a generally parallel direction relative to the longitudinal axis L as well as lower contact surfaces 58b.

The platform 52 of the stand 50 further carries a ratchet arm 60. In the illustrated example, this ratchet arm 60 is formed by a cutout 55 formed on the platform 52 that extends in a generally circular direction about the platform 52. In the illustrated example, the cutout 55 is in the form of an elongated, curved shape, but other example shapes or arrangements of the cutout 55 are possible. A proximal end 60a of the ratchet arm 60 is coupled to and/or formed integrally with the platform 52. The cutout 55 allows a distal end 60b of the ratchet arm 60 to move (i.e. rotate) about the proximal end 60a thereof. In the illustrated example, the ratchet arm 60 is generally coplanar to a plane formed by the upper side 52a of the platform 52, but in other examples, any relative angle may be formed between a plane formed by the ratchet arm 60 and the plane formed by the upper side 52a of the platform 52.

A protrusion 62 is positioned at the distal end 60b of the ratchet arm 60. This protrusion 62 may be in the form of a triangular prism or a pyramidal member that includes an angled sidewall 64 extending up and away from the upper side 52a of the platform 52 (i.e., in the same upward direction as the locking protrusion 56). Other shapes or arrangements of the protrusion 62 are possible, such as spherical, pyramidal, etc.

Figure 6A:
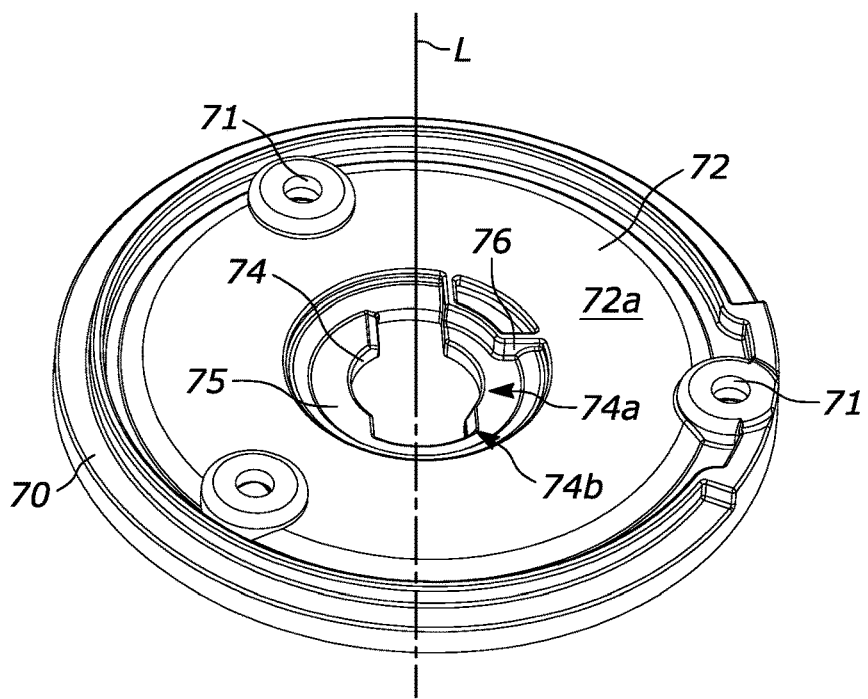
FIG. 6A is an upper elevation view of a gear member for use with the reader assembly of FIGS. 1-5 in isolation in accordance with this disclosure.
Figure 6B:
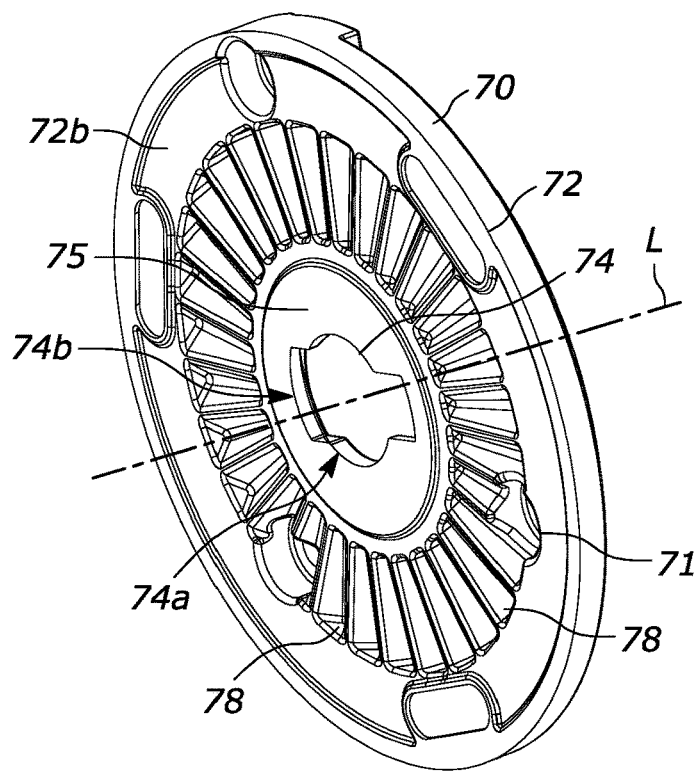
FIG. 6B is a lower elevation view of a gear member for use with the reader assembly of FIGS. 1-6A in isolation in accordance with this disclosure.

As illustrated in FIGS. 6A and 6B, the gear member 70 includes a body 72 extending between an upper surface 72a, and a lower surface 72b, a gear member coupling portion 74 in the form of an opening, a mechanical, rotational stop 76, and a number of recesses 78. The gear member 70 may additionally include any number of gear member mounting structures 71 such as threaded holes or openings that accept a fastener to mechanically couple the gear member 70 to the base 12 of the reader 11. In these examples, when the gear member 70 is coupled to the reader 11, the upper surface 72a is positioned adjacent to the lower portion 12b of the base 12. In other examples, the gear member 70 may be formed integrally with the base 12.

As previously mentioned, the gear member coupling portion 74 is in the form of an opening or hole extending between the upper and lower surfaces 72a, 72b of the body 72. The opening or hole is formed in a generally circular countersunk region 75 of the body 72. The gear member coupling portion 74 has a similar but slightly larger shape as the locking protrusion 56 and key members 58. In other words, the gear member coupling portion 74 includes a generally circular middle portion 74a and a number of generally rectangular "wings" 74b (corresponding to the number of key members 58) that extend from the middle portion 74a. Other shapes or combination of shapes are possible. The rotational stop 76 is positioned on the countersunk region 75 and is in the form of a raised shoulder that spans any desired portion (e.g., circumference) of the countersunk region 75. For example, the rotational stop 76 may span an area bout the circumference of the countersunk region between approximately 30° and approximately 50°. Other examples are possible.

The lower surface 72b of the body 72 defines any number of recesses 78. For example, the lower surface 72b of the body may define between approximately 25 and approximately 45 recesses, and preferably between approximately 30 and approximately 40 recesses. Other examples are possible. In some examples, a separate plate (not illustrated) that defines the recesses may be coupled to the body 72 of the gear member.

Figure 7:
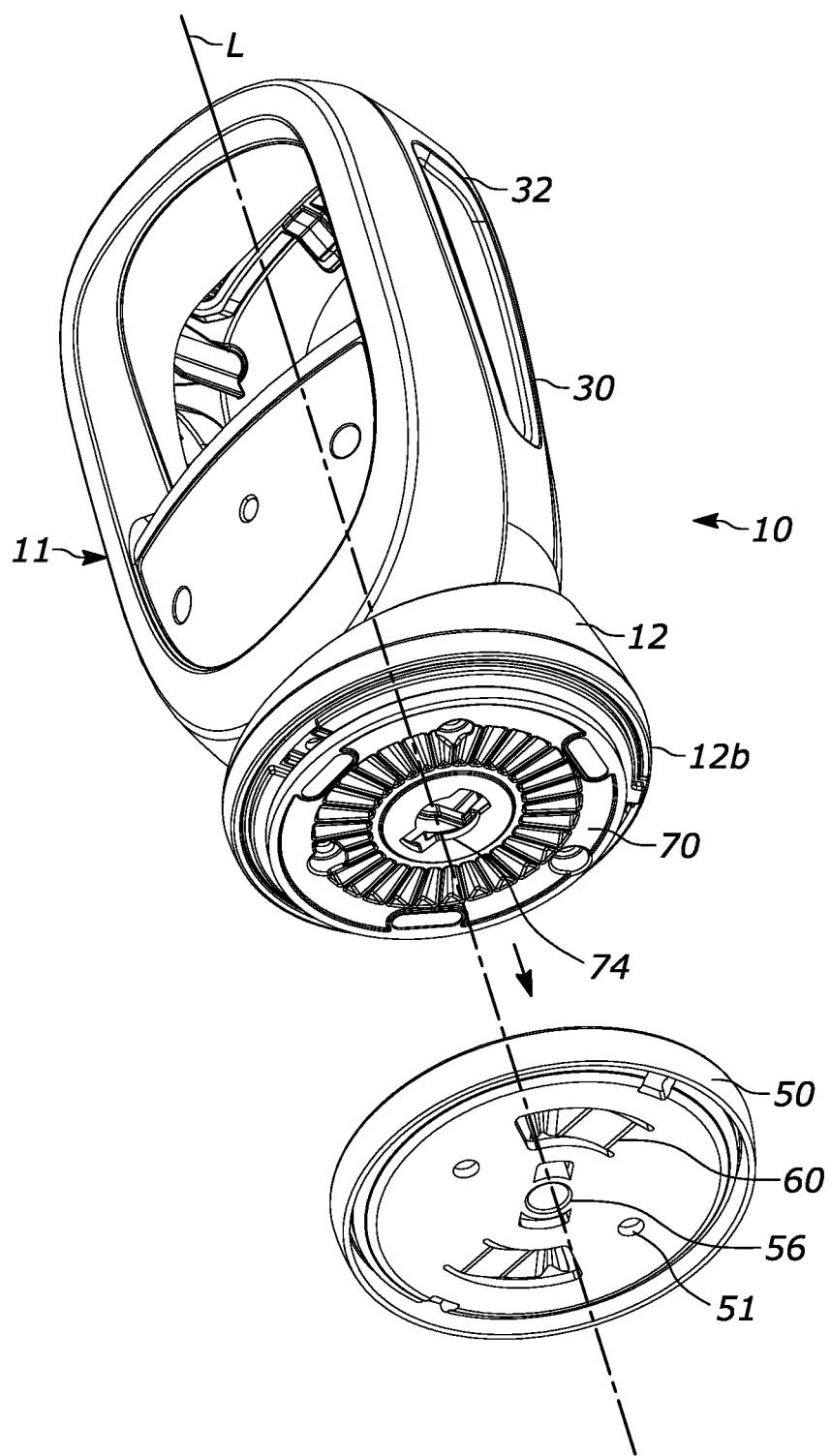
FIG. 7 is a lower elevation view of the reader assembly of FIGS. 1-6B in accordance with this disclosure.
Figure 8A:
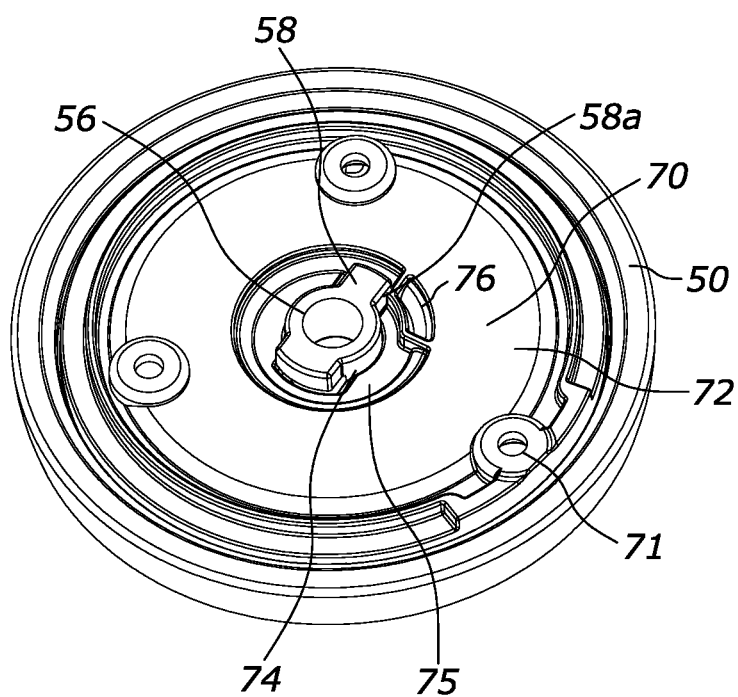
FIG. 8A is a perspective view of a gear member coupled to the stand in isolation in accordance with this disclosure.
Figure 8B:
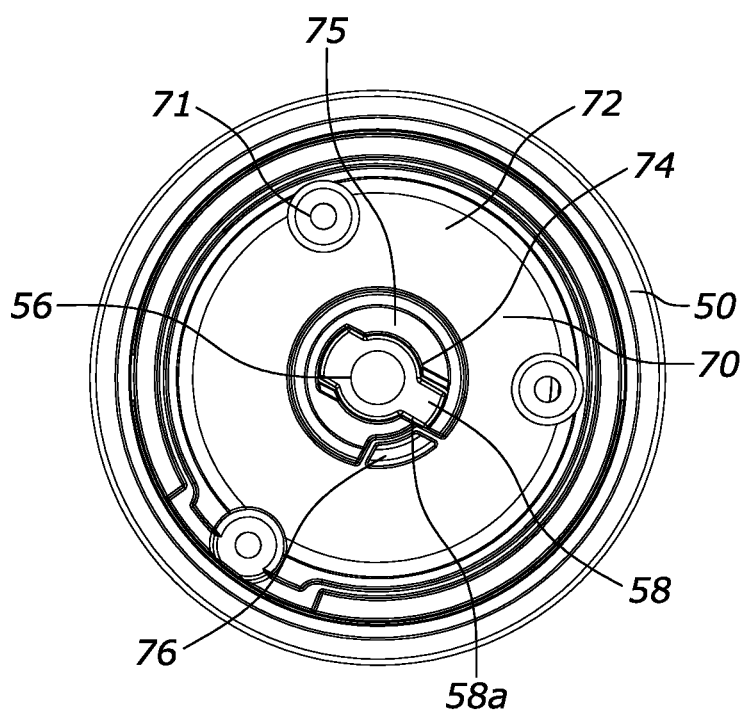
FIG. 8B is a top plan view of the gear member coupled to the stand in a first relative position in accordance with this disclosure.

As illustrated in FIG. 7, to secure the reader 11 to the stand 50, the base 12 is moved vertically onto the platform 52. During this coupling process, the locking protrusion 56 and the key members 58 must be aligned with the gear coupling portion 74 of the gear member 70. When aligned, and as illustrated in FIGS. 8A and 8B, the locking protrusion 56 is partially disposed through the gear coupling portion 74 of the gear member 70. While in this configuration, one of the side contact surfaces 58a of the key member 58 is positioned near and/or against the rotational stop 76. As a result, the gear member (and thus the reader 11 attached thereto) is restricted from further rotating in a clockwise direction relative to the stand 50, but the reader 11 may be freely removed from the stand 50.

The ratchet arm 60 is configured to exert an upward urging force on the reader 11 when coupled to the stand 50. Upon placing the reader 11 on the stand 50, the lower surface 72b, (i.e., a non-recessed portion) of the gear member 70 contacts the protrusion 62 of the ratchet arm 60, thereby urging the ratchet arm 60 downwards. The protrusion 62 of the ratchet arm 60 will eventually be aligned with one of the recesses 78 of the gear member 70 so that the protrusion 62 is at least partially inserted into the recess 78.

To operate and/or reposition the reader 11, a user may grasp a portion of the reader enclosure 30 and urge a portion (e.g., the top portion 32a) of the enclosure body 32 in a desired direction to cause the reader enclosure 30 to tilt upwards or downwards relative to the base 12 and the stand 50. Further, the user may rotate the reader 11 relative to the stand 50 about the axis L. So configured, a user may position a barcode or other object within the FOV of the reader 11. The user may engage a trigger or other mechanism that causes the reader 11 to capture an image of the barcode or other object. Alternatively, in some examples, the reader 11 may be activated in a presentation mode to capture an image of the barcode or other object.

More specifically, relative rotation between the reader 11 and the stand 50 will cause the protrusion 62 of the ratchet arm 60 to disengage from a first recess 78 and engage an adjacent recess 78. The resilience of the ratchet arm 60 causes the protrusion 62 to move into an adjacent recess, and may be retained therein until an rotational urging force exerted by the user is greater than the engaging force between the protrusion 62 and the recess 78. As a result, the reader 11 may be selectively retained at a desired rotational angle or configuration relative to the stand 50.

Figure 8C:
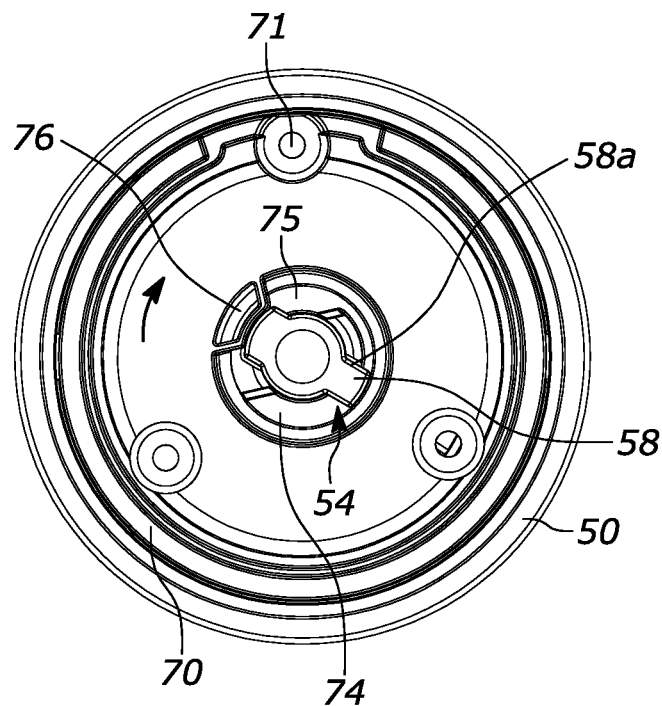
FIG. 8C is a top plan view of the gear member coupled to the stand in a second relative position in accordance with this disclosure.
Figure 8D:
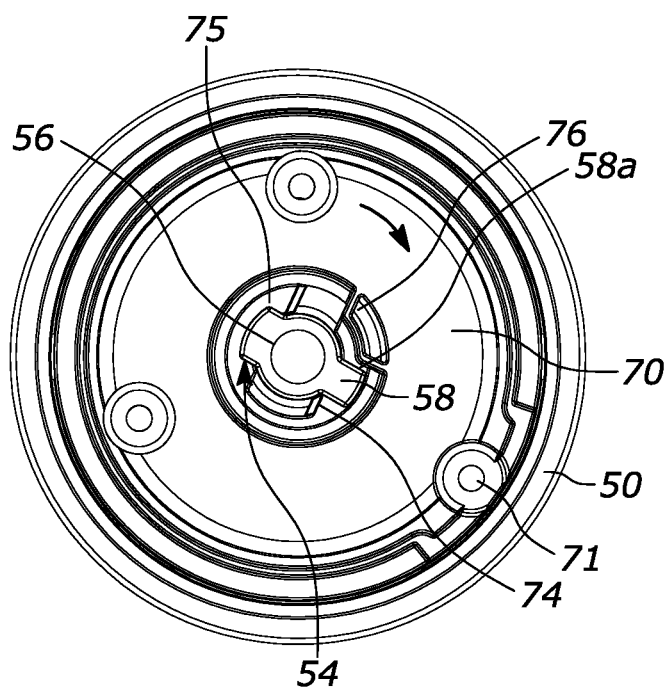
FIG. 8D is a top plan view of the gear member coupled to the stand in a third relative position in accordance with this disclosure.

Further, as illustrated in FIGS. 8C and 8D, relative rotation between the reader 11 and the stand 50 causes the locking protrusion 56 to engage the gear member coupling portion 74, and thus secure the reader 11 to the stand 50. Specifically, during relative rotation of the reader 11 and the stand 50, the lower contact surface 58b of the key member 58 slides over the countersunk region 75. In this configuration, the locking protrusion 56 is restricted from moving axially along the longitudinal axis L, and as such, the reader 11 is rotatably coupled to the stand 50 and cannot be removed therefrom. As illustrated in FIG. 8D, continued rotation of the reader 11 relative to the stand 50 causes the side contact surface 58a of the key member 58 to be positioned against the rotational stop 76, thereby limiting further rotational movement.

To decouple the reader 11 from the stand, the reader is rotated until the gear coupling portion 74 of the gear member 70 is aligned with the positioning of the locking protrusion 56. Once aligned, the reader 11 may be lifted off of the stand 50.

Figure 4:
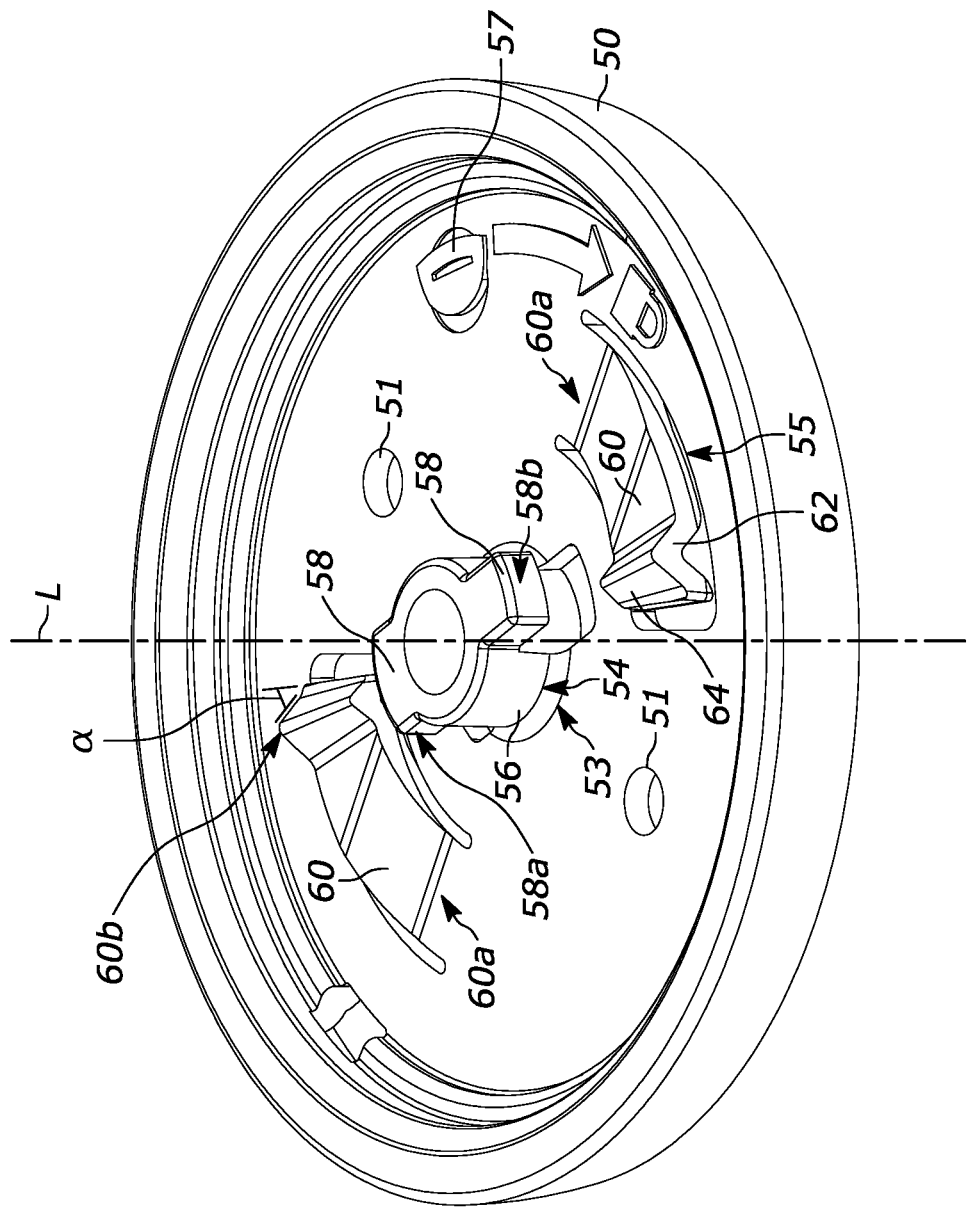
FIG. 4 is a first upper perspective view of the stand of FIGS. 1-3 in isolation in accordance with this disclosure.
Figure 5:
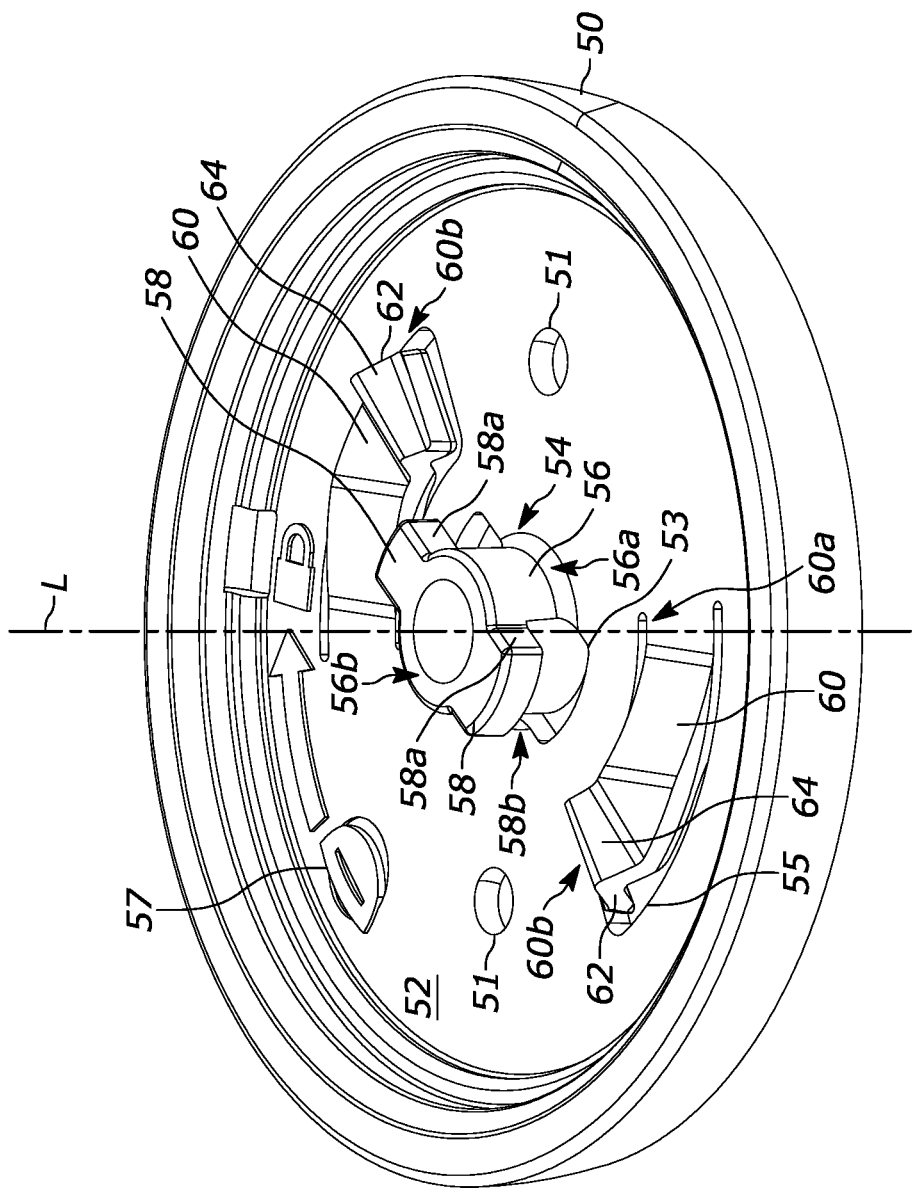
FIG. 5 is a second upper perspective view of the stand of FIGS. 1-4 in isolation in accordance with this disclosure.

The force needed to rotate the reader 11 relative to the stand 50 may be adjusted by varying the angle α (FIG. 4) of the angled sidewall 64 relative to the longitudinal axis L. Alternatively, a pitch of the recess 78 may be similarly modified as desired. For example, when the angle α is relatively large (e.g., between approximately 46° and approximately 89°, resulting in a relatively gentle slope), the engaging force between the angled sidewall 64 and the recess 78 is low and thus the reader 11 may be rotated relative to the stand 50 with minimal effort. Conversely, if the angle α is relatively small (e.g., between approximately 1° and approximately 45°, resulting in a relatively steep slope), the engaging force between the angled sidewall 64 and the recess 78 is high, and thus a greater force is required to rotate the reader 11 relative to the stand 50.

In some examples, only one of the locking protrusions 58 may be dimensioned and arranged to engage the countersunk region 75, and the other of the locking protrusions 58 may be dimensioned and arranged to engage the rotational stop 76. As such, during relative rotation, only the desired locking protrusion 58 may contact the rotational stop 76. As a result, the reader may have a desired overall rotational FOV that is only limited by the arc spanned by the rotational stop 76.

In some examples, the arrangement of the components of the barcode reader assembly 10 may be reversed. For example, the gear member 70 may be carried by the stand 50, and the base 12 and include a locking protrusion that extends downwardly into a gear member coupling portion formed by the stand 50. In yet other examples, rather than providing recess 78, the gear member 70 may provide outward-facing teeth which create valleys therebetween. These valleys may be configured to receive the protrusion 62 and provide restraint against rotational movement in a manner similar to the interaction between the recesses 78 and the protrusion 62. In these examples, the protrusion 62 can be selectively positioned in a valley formed between adjacent gear tooth.

Figure 9:
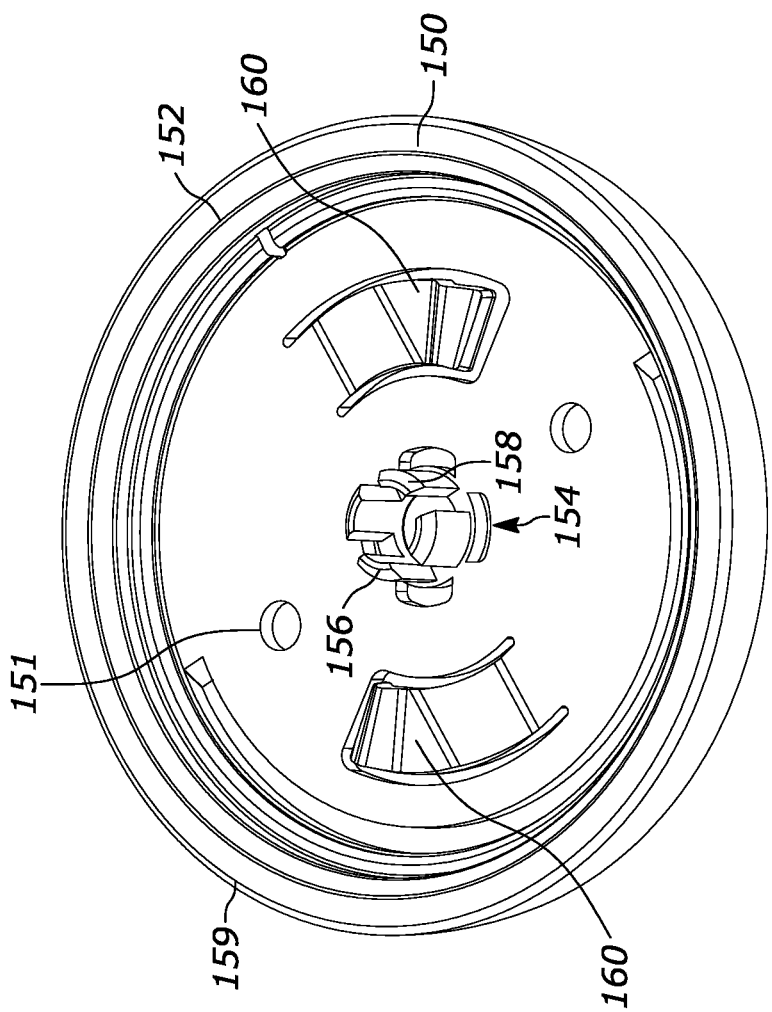
FIG. 9 is a perspective view of an alternative stand in isolation in accordance with this disclosure.

As illustrated in FIG. 9, an alternate stand 150 is provided that includes many of the features of the stand 50 described herein. Accordingly, these features will not be described in further detail. The stand 150 includes a locking protrusion 156 in the form of a generally conical member that includes a number of fingers 158 that act as snaps to engage the countersunk region 75 of the gear member 70. In these examples, the locking protrusion 156 is generally resilient, and moves inwardly when engaging the gear member coupling portion 74 of the gear member 70. Upon being inserted through the opening, the fingers 158 are displaced outwardly such that they engage the opening of the gear member 74, and thus prevent relative rotation.

Further, in this example, the stand 150 defines a rotational lock 159 that extends about a portion of the base 150. This rotational lock 159 engages a protrusion (not illustrated) formed in the gear member 70 to selectively limit relative rotation between these components.

So configured, the barcode reader assembly 10 may use a single accessory stand that is capable of providing selective rotation and locking of the reader 11. Because of the arrangements of the wall 54 and the resilient finger 60, the reader 11 is capable of rotation in either the locked or unlocked configurations. As a result, a robust rotational mechanism may be used while maintaining minimal gaps or clearances between components and surfaces that move relative to each other. Accordingly, moving components are not exposed to elements that may impede proper tilting or rotation of the device, and the likelihood of a user's fingers becoming pinched are reduced. Additionally, the reader may be positioned and secured on non-horizontal surfaces such as walls while avoiding the risk of falling out and being damaged.

In any or all of these implementations, the barcode reader assembly 10 may be alternately operable in at least one of a manual mode or a presentation or hands-free mode. The assembly 10 may be jointly lifted as a unit off the support surface, and held in an operator's hand, and used in a handheld or manual mode of operation in which a trigger mechanism is manually actuated and depressed to initiate reading of symbol/document, such as a barcode on a product, in a range of working distances relative to a window. In a presentation or hands-free mode of operation, the reader 10 is jointly mounted on the support surface in which symbol/document targets are presented in a range of working distances relative to the window for reading.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A barcode reader assembly for capturing at least one image of an object appearing in a field of view (FOV), the barcode reader assembly comprising:
   a reader including a reader enclosure having a top portion and a bottom portion, the bottom portion forming a base;
   a gear member including a gear member coupling portion, the gear member being mechanically coupled to the bottom portion of the reader enclosure; and
   a stand including a platform and a platform coupling portion;
   wherein the gear member coupling portion is mechanically coupled to the platform coupling portion such that the reader is rotatable relative to the stand,
   wherein the gear member includes a plurality of recesses, and the platform includes at least one ratchet arm that selectively engages the plurality of recesses to at least temporarily restrain the reader at a desired position relative to the stand.

2. The barcode reader assembly of claim 1, wherein the gear member is coupled to the platform via a mechanical linkage, wherein the mechanical linkage includes a locking protrusion component extending upwardly from the platform.

3. The barcode reader assembly of claim 2, wherein the locking protrusion component includes at least one key member extending transversely from a portion of the locking protrusion component.

4. The barcode reader assembly of claim 1, wherein the gear member includes between approximately 30 and approximately 40 recesses.

5. The barcode reader assembly of claim 1, wherein the at least one ratchet arm is formed by a cutout formed on the platform, wherein the at least one ratchet arm is rotatable about a connection point formed on the platform.

6. The barcode reader assembly of claim 1, wherein the gear member is formed integrally with the reader enclosure.

7. The barcode reader assembly of claim 1, further comprising a mechanical stop formed on one of the reader enclosure, the gear member, or the platform, the mechanical stop being engageable to restrict relative rotation between the reader and the stand.

8. The barcode reader assembly of claim 1, wherein the reader base is coupled to the platform via a mechanical linkage, wherein the mechanical linkage includes a locking protrusion component extending downwardly from the gear member.

9. The barcode assembly of claim 1, wherein the stand further comprises a mounting structure to mount the stand to an object.

10. A barcode reader assembly for capturing at least one image of an object appearing in a field of view (FOV), the barcode reader assembly comprising:
    a reader including a reader enclosure having a top portion and a bottom portion, the bottom portion including a reader coupling portion;
    a stand including a platform;
    a gear member being mechanically coupled to the platform of the stand, the gear member including a gear member coupling portion;
    wherein the gear member coupling portion is mechanically coupled to the reader coupling portion such that the reader is rotatable relative to the stand,
    wherein the gear member includes a plurality of recesses, and the bottom portion of the housing includes at least one ratchet arm that selectively engages the plurality of recesses to at least temporarily restrain the reader at a desired position relative to the stand.

11. The barcode reader assembly of claim 10, wherein the gear member is coupled to the platform via a mechanical linkage, wherein the mechanical linkage includes a locking protrusion component extending downwardly from the bottom portion of the reader.

12. The barcode reader assembly of claim 11, wherein the locking protrusion component includes at least one key member extending transversely from a portion of the locking protrusion component.

13. The barcode reader assembly of claim 10, wherein the gear member includes between approximately 30 and approximately 40 recesses.

14. The barcode reader assembly of claim 10, wherein the at least one ratchet arm is formed by a cutout formed on the bottom portion of the housing, wherein the at least one ratchet arm is rotatable about a connection point formed on the bottom portion of the housing.

15. The barcode reader assembly of claim 10, wherein the gear member is formed integrally with the stand.

16. The barcode reader assembly of claim 10, further comprising a mechanical stop formed on one of the reader enclosure, the gear member, or the platform, the mechanical stop being engageable to restrict relative rotation between the reader and the stand.

17. The barcode assembly of claim 10, wherein the stand further comprises a mounting structure to mount the stand to an object.

\* \* \* \* \*